Jan. 17, 1961 W. K. VOLKERS 2,968,768
NOISE SEPARATOR TO IMPROVE SIGNAL-TO-NOISE RATIO
Filed Aug. 1, 1956 5 Sheets-Sheet 1

INVENTOR
WALTER K. VOLKERS

INVENTOR
WALTER K. VOLKERS

NOISE SEPARATOR TO IMPROVE SIGNAL-TO-NOISE RATIO

Filed Aug. 1, 1956

5 Sheets-Sheet 3

INVENTOR
WALTER K. VOLKERS

Jan. 17, 1961 W. K. VOLKERS 2,968,768

NOISE SEPARATOR TO IMPROVE SIGNAL-TO-NOISE RATIO

Filed Aug. 1, 1956 5 Sheets-Sheet 4

INVENTOR
WALTER K. VOLKERS

Jan. 17, 1961 W. K. VOLKERS 2,968,768

NOISE SEPARATOR TO IMPROVE SIGNAL-TO-NOISE RATIO

Filed Aug. 1, 1956

5 Sheets-Sheet 5

INVENTOR
WALTER K. VOLKERS

United States Patent Office 2,968,768

Patented Jan. 17, 1961

2,968,768

NOISE SEPARATOR TO IMPROVE SIGNAL-TO-NOISE RATIO

Walter K. Volkers, 519 Glen Ave., Scotia, N.Y.

Filed Aug. 1, 1956, Ser. No. 601,559

1 Claim. (Cl. 330—124)

My invention concerns the reduction of noise in amplifiers by providing in them more than one input stage. Although amplifiers built in accordance with this invention will show a noticeable noise reduction if, in place of the usual single input stage, two parallel input stages are used, they will show a much more pronounced decrease of noise with a larger number of parallel input stages, such as 5, 10, 25, etc.

My invention is based on the well understood fact that random noise signal voltages $E_{N1}$, $E_{N2}$, $E_{N3}$, . . . . . add to each other quadratically. In other words:

$$\sum_n E_N=\sqrt{(E_{N1})^2+(E_{N2})^2+(E_{N3})^2+\ .\ .\ .\ (E_{Nn})^2} \quad (1)$$

Signal voltages, having an odd frequency-spectral relationship, i.e. being uncorrelated, add to each other in the same fashion:

$$\sum_n E_S=\sqrt{(E_{S1})^2+(E_{S2})^2+(E_{S3})^2+\ .\ .\ .\ (E_{Sn})^2} \quad (2)$$

On the other hand, signals of equal frequency and identical phase, that is, correlated signals, add to each other linearly as follows:

$$\sum_n E_S=E_{S1}+E_{S2}+E_{S3}+\ .\ .\ .\ E_{Sn} \quad (3)$$

My invention is based on the recognition of the fact that it is possible to improve the typical signal-to-noise ratio of a given amplifier stage by using more than one such stage and connecting the inputs of all these stages, as well as their outputs, in parallel. In doing this the desired signal follows Equation 3 while the uncorrelated noise voltages follow Equation 1. Assuming that the gains of all parallel input stages used are identical and that the noise amplitudes of all these stages, though uncorrelated among themselves, happen to be of equal magnitude, each stage produces quantitatively the same output noise voltage $\overline{E_{N1}}$. This noise voltage can be any combination of actual output noise and amplified input noise. Its physical origin can be thermal noise, shot noise, flicker noise, $1/f$ noise, separation noise, or any of the numerous types of noise known. The signal-to-noise voltage ratio of a single amplifier stage can then be written as $$\sigma_1=\frac{E_{S1}}{E_{N1}} \quad (4)$$

while the signal-to-noise ratio of the total system, comprising $n$ parallel input stages, would be $$\sigma_n=\frac{nE_{S1}}{\sqrt{n}E_{N1}} \quad (5)$$

This is so because the in-phase signals add to each other linearly, being identical in amplitude, phase and frequency, while the uncorrelated noise voltages add to each other quadratically.

The actual improvement of signal-to-noise voltage ratio which can then be expected, by using more than one input stage, is therefore the ratio of $\sigma_n$ and $\sigma_1$, i.e.

$$\frac{\sigma_n}{\sigma_1}=\frac{n}{\sqrt{n}}=\sqrt{n} \quad (6)$$

while the improvement of signal-to-noise power ratio is $$\frac{\sigma P_n}{\sigma P_1}=(\sqrt{n})^2=n \quad (7)$$

In other words, a substantial improvement of signal-to-noise ratio, voltage or power-wise, can be obtained by operating amplifiers with more than one input tube and connecting these input tubes in parallel.

This holds true not only for vacuum tubes but for all amplifying devices, including transistors and all other conceivable amplifiers, whether electronic, electromagnetic, electrical in general, or mechanical, chemical, etc.

The principle is true in general of any form of uncorrelated (random) noise. The noise, as far as electronic amplifiers are concerned, may even be developed in stages other than the input stage. It may also be mixer noise. As a matter of fact, the principle is true not only of amplifiers but of any form of transducer.

A good example of this would be acoustical noise. By connecting several microphones in parallel, signal-to-noise ratio can be definitely improved if the local acoustical noise spectra picked up by each microphone are uncorrelated or partially correlated. Another typical example would be thermal noise and cosmic noise (static) or local jamming in several antennas, receiving in parallel the same desired signal but having individual uncorrelated noise spectra of their own. The latter may be caused by individual, inherent thermal noise, locally varying static interference conditions, and enemy jamming signals displaying a statistically different noise spectrum in each individual antenna location.

Extensive tests conducted with multiple input tubes being connected in parallel have fully confirmed the basic concept of the invention, that noise, in this particular case either vacuum tube noise or amplified thermal resistor noise, can be drastically reduced by using more than one input tube.

The invention will be better understood by referring to the drawing in which:

Fig. 1 shows a 3 stage vacuum tube amplifier having conventional circuitry,

Fig. 2 a modification of the same amplifier using three parallel input tubes in order to reduce noise, Fig. 3 a modification of Fig. 2 in which not only the input stage but also the following stage are represented by parallel amplifiers for the purpose of reducing noise.

Figure 8:
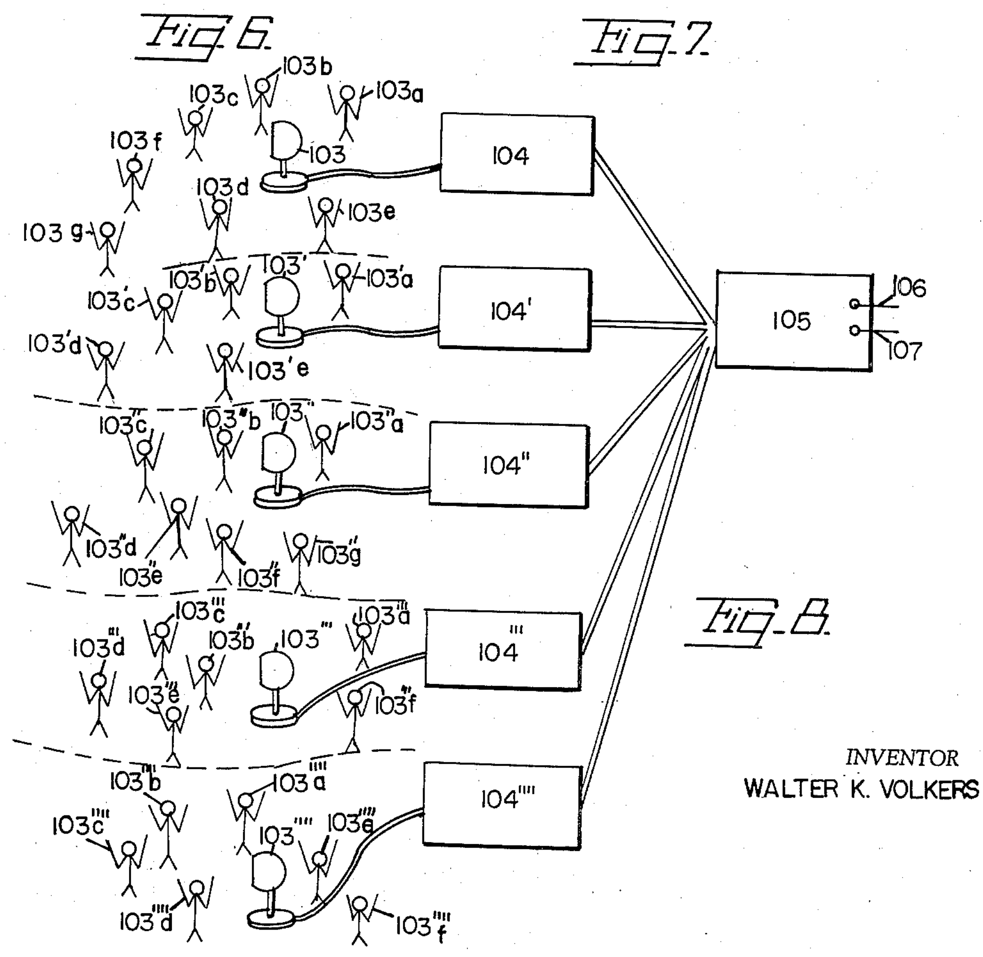

Fig. 8 refers to a non-electronic amplification of the noise-separator principle, the noise to be eliminated being acoustical.

Figure 1:
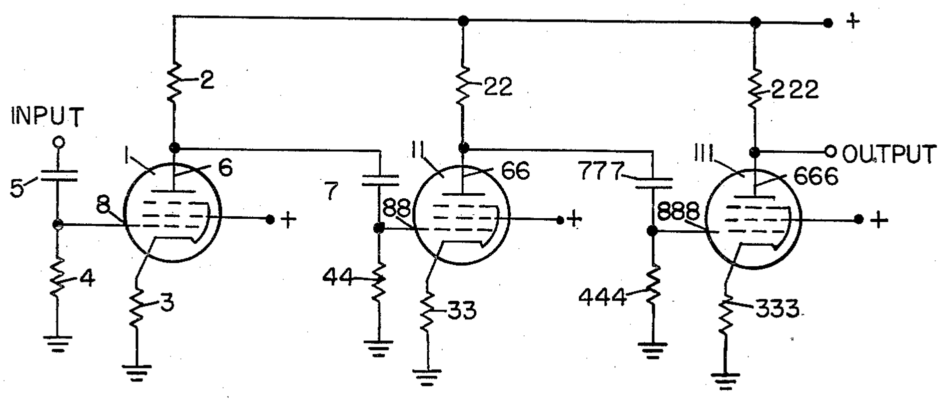
PRIOR ART Fig. 1

The conventional amplifier in Fig. 1 is R-C coupled, its input tube 1 being a pentode. It has a load resistor 2 and a cathode biasing resistor 3, as well as a grid leak 4. The input signal is fed into its control grid 8 through coupling condenser 5. The plate 6 of input tube 1 is coupled capacitatively through condenser 7 to grid 88 of the second stage 11. The plate 66 of the second stage is then coupled, through condenser 77, to grid 888 of output tube 111. All other corresponding circuit elements of the three tubes are marked accordingly. Thus, the second stage elements bear double numbers, and those of the third stage triple numbers.

The signal-to-noise ratio in a normal amplifier of this kind is determined by inherent design properties of the type of input tube, also, though possibly to a minor extent, by tubes in later stages. It is furthermore influenced by the noise characteristics of associated circuit components, such as the extra noise (non-thermal) in load resistor 2, and also to a considerable extent by operating parameters selected for this particular amplifier, such as plate voltage, plate current, screen voltage, grid-bias, etc.

Figure 2:
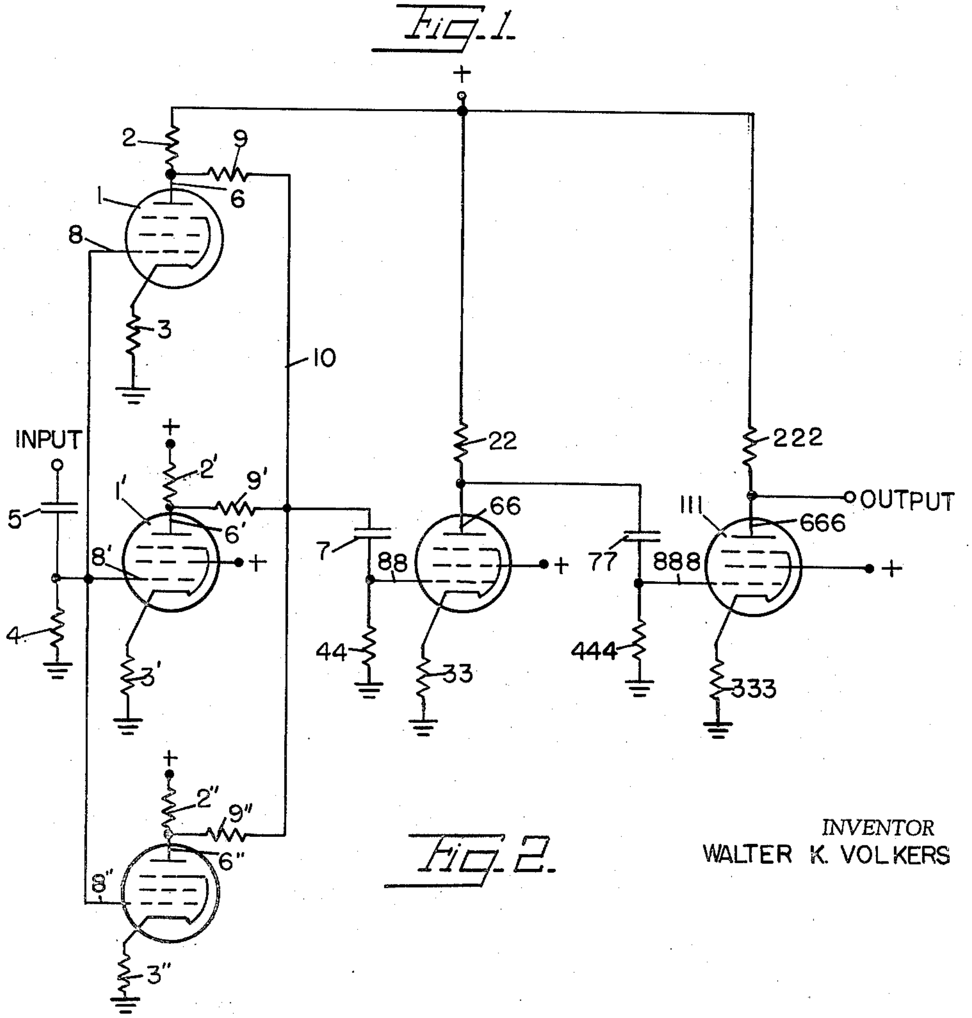

Fig. 2 shows how the signal-to-noise ratio of the amplifier in Fig. 1 can be improved by equipping it with more than one input tube. In this circuit three tubes, 1, 1′, 1″, are used. Again components are marked in logical order, using the same numbers as in Fig. 1 and adding ′ or ″ to them whenever the same component appears in the second or third parallel input tube.

While the input grids 8, 8′, and 8″ are connected directly in parallel, sharing a common grid lead 4, the plates 6, 6′, and 6″ are not paralleled directly; they have decoupling resistors 9, 9′, and 9″ which are connected to a common bus bar 10 to which the coupling condenser 7 to the next stage is attached.

Experiments have clearly proved that Equations 6 and 7 apply to this kind of amplifier if the following important condition is fulfilled: The output noise must be "dominated" by the input stage. That is, there must be sufficient gain in the single (Fig. 1) or multiple (Fig. 2) input stage to mask completely the noise of the second stage 11 and the third stage 111. Tests have shown that if this condition is fulfilled the signal-to-noise voltage ratio, with three parallel input tubes, will be improved by a factor of $\sqrt{3}$, or approximately 1.7, as against the average signal-to-noise voltage ratio which each of the three input tubes displays if used alone in accordance with conventional circuitry according to Fig. 1. This means that the signal-to-noise power ratio is improved by a factor of 3.

Theoretically it is thus possible to approach an infinite signal-to-noise power ratio with an infinite number of input tubes; and practically, it is quite possible to increase signal-to-noise ratios substantially by factors such as 10 db, 20 db, 30 db, or more. A sufficiently large number of parallel input tubes will provide such improvements.

However, when adding more and more input tubes to the circuit, a point can be reached, and has actually been observed in experimentation, at which the signal-to-noise ratio improvement, created by paralleling a large number of input tubes, is so great that input tube noise is masked by the noise of the second amplifier stage. This can happen even if the voltage and power gain of the multiple first stage is appreciable and, generally speaking, made as high as possible. Whether or not it will happen depends upon the degree of signal-to-noise ratio improvement in the first stage through paralleling of a sufficiently large number of input tubes.

Figure 3:
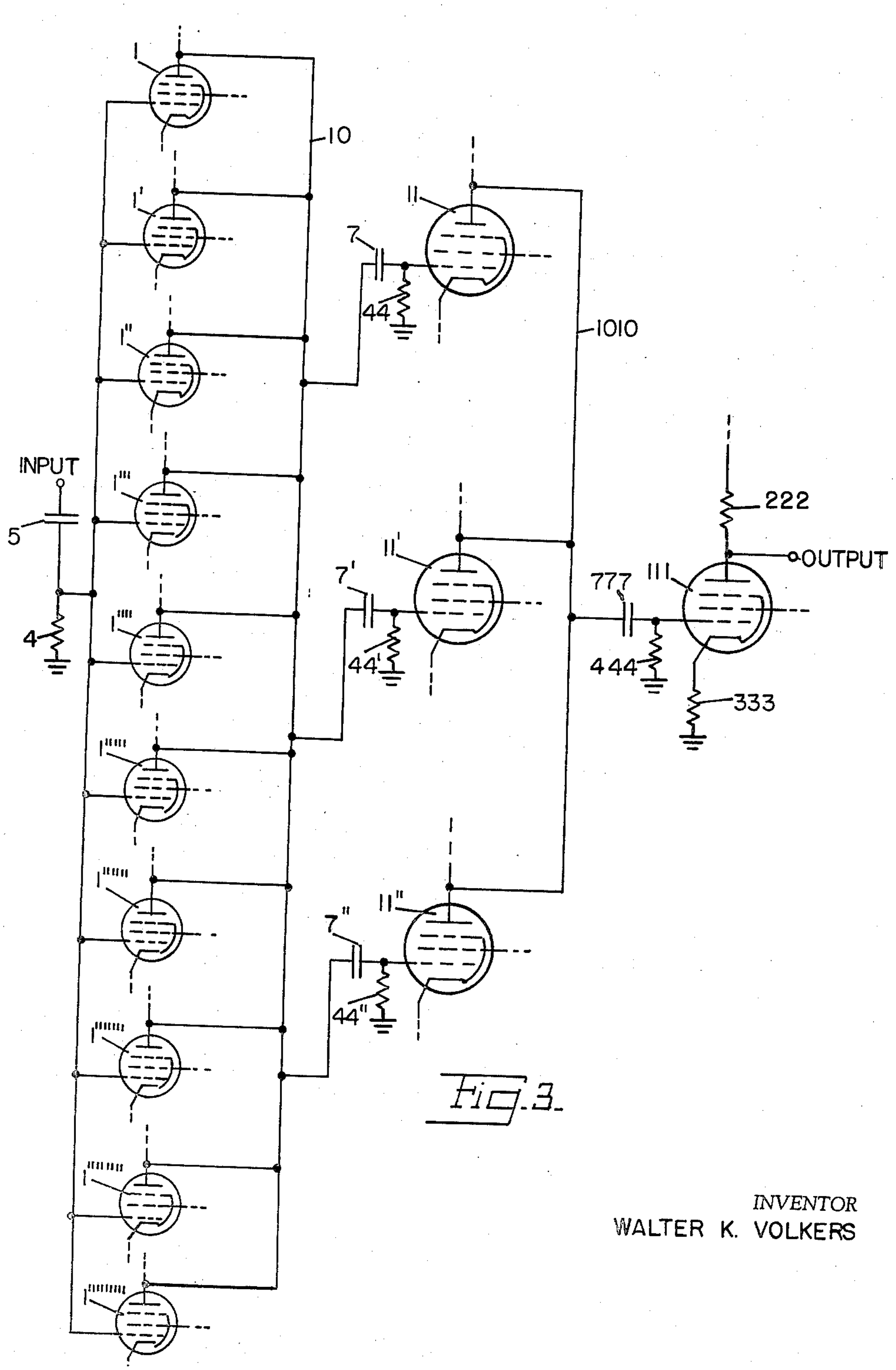

Fig. 3 shows how in such a case a further signal-to-noise ratio improvement can be obtained, by adding even more tubes to the amplifier. In this figure we have ten parallel input tubes. The second stage also has been "split" into three parallel "strands." Thus average relative noise power in the input stage has been reduced by a ratio of 1/10 and in the second stage by 1/3. Thus the noise-masking effect of the second stage has been reduced sufficiently to again make noise in the first stage either dominant or nearly dominant.

The example in Fig. 3 of splitting the input stage into ten parallel strands and the second stage into three parallel strands may be found desirable in a case where individual average noise voltages of the input tubes and second stage tubes are approximately equal while voltage gain of the first stage is lower than $\sqrt{10}$, or roughly 3.2. Second stage noise would then be reduced sufficiently to prevent it from becoming dominant after the noise of the first stage has been decreased, through tube-paralleling, to a point where it is of the same order as the noise of the second stage, even after amplification.

Figure 4:
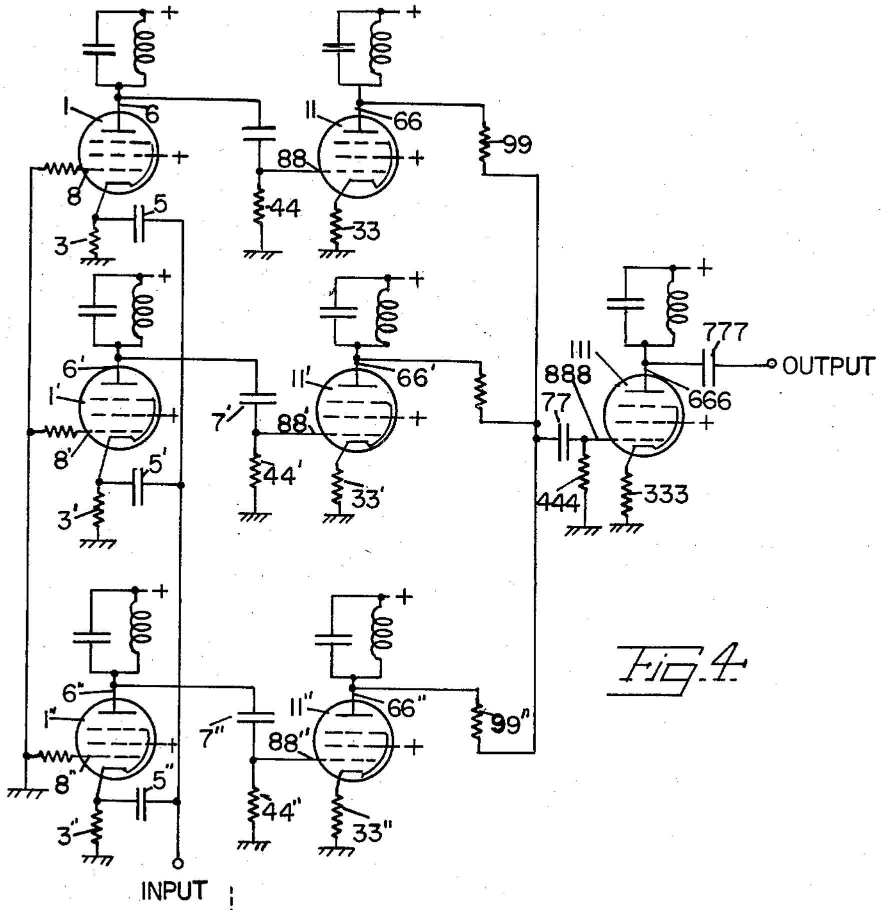
Fig. 4 shows a modification of the circuit in Fig. 1, while Fig. 5 gives an example of the application of the noise separator principle to the reduction of noise not originating in the input stage.

While from the standpoint of simple tube-economy it may be advisable to use a larger number of parallel "amplifier strands" in the input stage (such as ten in Fig. 3) than in the second stage (three in Fig. 3), there may be other considerations which would make a more symmetrical arrangement of first and second stage tubes desirable. Fig. 4 shows such an example.

In Fig. 4 the input circuit consists of three parallel two-stage amplifiers, each being a complete unit in itself. They then feed the input of the third stage which is a single tube. Important design considerations in manufacturing, such as identity of phase shifts and production simplification, may be decisive factors advocating the choice of an input tube arrangement such as that in Fig. 4.

While in the preceding description of circuits comprising parallel amplifier stages it has been assumed that noise in the input stage is dominant, the total noise of the amplifier being reduced by splitting both the input stage and subsequent stages into parallel strands, there are cases where the second or later stage may produce dominant noise. Typical examples are: a hushed transistor input stage followed by a vacuum tube stage, or a vacuum tube input tube operating at low plate voltage followed by a vacuum tube operated at high plate voltage, or a triode followed by a pentode, or an amplifier stage followed by a mixer stage. In these four and other cases, noise in the following stage may be so much higher than noise in the preceding stage that even in view of the first stage's gain, noise in the following stage can be dominant. In that case the subsequent stage may be split into several strands, the preceding remaining single, or the subsequent stage may be split into a larger number of strands than the preceding stage.

It should also be understood that the word "tube" is being used here in a broad sense, covering any type of amplifier, including transistors, magnetic amplifiers, dielectric amplifiers, etc.

In the four examples of amplifier circuits described in detail so far (Figs. 1 to 4), signal-to-noise ratio has been increased by paralleling input tubes or input stages.

Since any such improvement of signal-to-noise ratio is equivalent to a reduction of noise by itself, at least as far as the actual usefulness of the amplifier is concerned, it can also be said that the four circuits shown, as well as the many other circuits incorporating the principle of splitting amplifier stages into individual strands which can be devised, actually effect a "separation" of signal and noise. Noise, in this instance, is the "typical" noise of whatever amplifying device or transducer is employed. In fact, if we use the ability of our transducer to generate a certain signal amplitude in its output with a given signal input or if we use the signal gain of an amplifier stage under consideration as our reference point for both output signal and output noise, it can be said that paralleling transducers or amplifier stages has physically the same effect which the ideal long-sought-after "noise filter" would have, that is a filter which discriminates against noise but not against signals.

Such filters have generally been considered an impossibility. It has always been felt that filters are band-pass restrictors and will necessarily affect signal and noise alike. It is also a general conception today that filters are effective against noise only if the noise frequency spectrum is wider than the desired signal frequency range, and that filters are powerless against those components of the noise spectrum which fall within the desired signal frequency range.

The noise separator, forming the subject of this invention, breaks this well established conception. Its basic principle can be applied to any conceivable signal or intelligence transmitting system, whether it involves amplifiers or not. The following figures show a few examples of applications of the noise separator outside of noise reduction in input stages of amplifiers.

Figure 5:
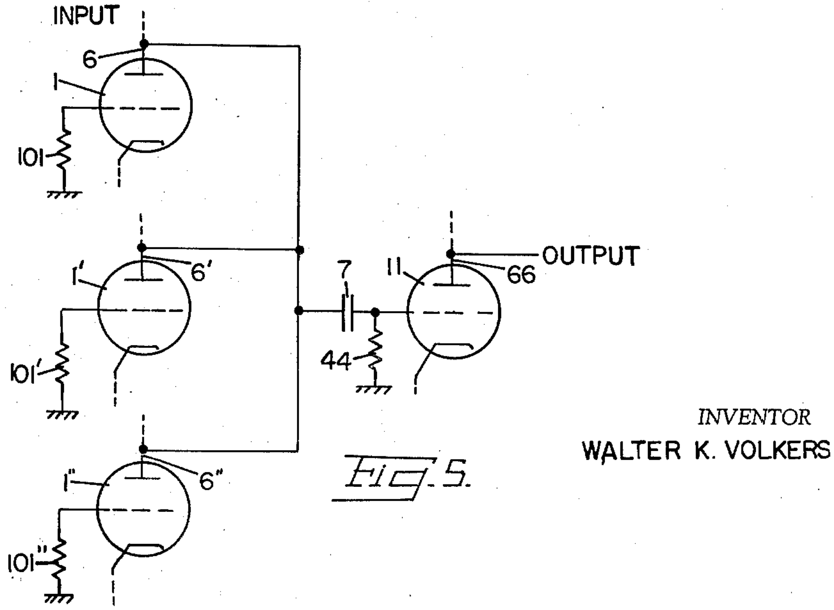

In Fig. 5 there are three noise-generating resistors 101, 101', and 101''. These may be ordinary resistors or the resistances of any kind of transducer. The thermal noise in each of these three resistors is statistically independent of the noise in the others. Such noise may be purely thermal or a combination of thermal noise and "extra" noise; a good example of extra noise would be the noise created in carbon resistors and carbon microphones as a D.C. current flows through them.

The main difference between the input circuit in Fig. 5 and the circuit in Fig. 1 is that in Fig. 5 the three resistors 101, 101', and 101'' are the dominating noise sources, masking the noise of each input tube, while in Fig. 1 tube noise is considered to be dominant. Noise in Fig. 5 will again follow Equation 1, and in-phase signals developed in or impressed upon the three resistors will obey Equation 3. Again, an improvement of signal-to-noise ratio according to Equations 6 and 7 will result.

Figures 6, 7:
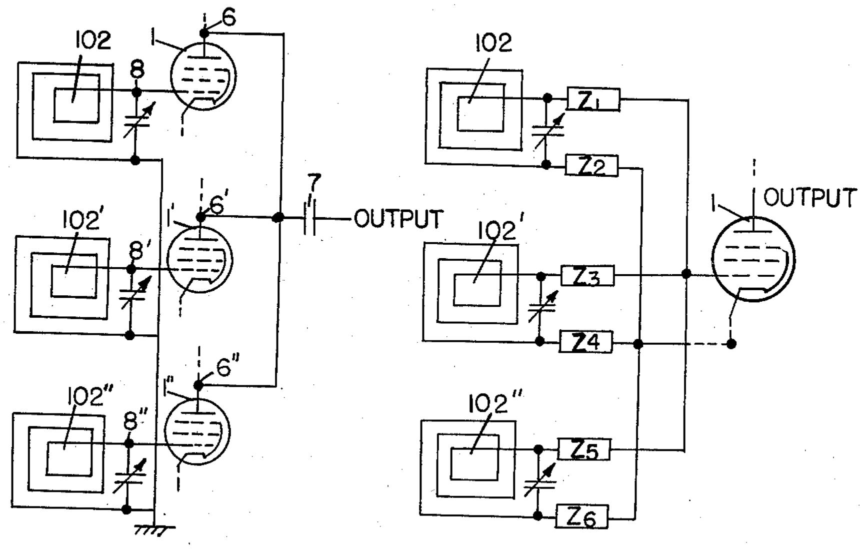
Fig. 6 illustrates how the same principle can be applied to radio-antennae.
Fig. 7 shows a modification of the antenna-amplifier arrangement in Fig. 6.

Fig. 6 gives another example of how a noise separator can be applied to the reduction of relative noise developed in transducers other than amplifier stages. Three antennae 102, 102', and 102'' are shown which feed signals into three input tubes 1, 1', and 1''. The noise separator will improve the average signal-to-noise ratio of these three antennae if noise in them is statistically independent. There is no question that thermal noise in the antennae will always be independent; but static signals, including artificial static created by enemy jamming, may not always be uncoordinated. This depends to a large extent upon the physical location of the antennae and the source of natural or hostile interference. Static disturbances such as occur in or near a large city are usually the type which can best be described by describing their origin as a large number of random pulse transmitters which are distributed over the entire city area. Those nearest to an individual receiver are the ones that are most audible; others may not be capable of penetrating the receiver's threshold of sensitivity.

Therefore, even with moderate spacing of the three antennae, say one-quarter, one-half, one, or two miles, completely different noise spectra may be experienced in each antenna. By combining their outputs before or after amplification, a considerably improved signal-to-noise ratio may be obtained.

Fig. 7 shows a variation of the multiple-antenna example. In this case combination, for noise reduction purposes, of three received signals is carried out without pre-amplification. Again the signal-to-noise ratio will be improved, at least as far as uncorrelated or partially correlated extra noise, such as static and jamming, is concerned. In other words, a noticeable reduction of the reception of jamming signals will become apparent only if the locations of jamming transmitters are such that their statistical noise spectra differ in the three antennae.

A further important qualification is necessary concerning the antenna noise separators in Figs. 6 and 7: These circuits are useful only if it is possible to arrange the antennae in such a manner that their received signals are in phase or reasonably nearly in phase. This problem is comparatively simple if distances between antennae are moderate and if transmitting frequencies are low. It increases in difficulty with higher transmitting frequencies.

Multiple antennae systems as such have, of course, been known for many years. In inter-continental broadcasts, for instance, "diversified" reception systems are quite common, usually with each antenna having a different horizontal inclination and feeding its own complete receiver. The outputs of these receivers are then mixed. The purpose of these systems is to reduce the effects of fading. An average between the three received signals is established with the hope that, while some of the antennae and their receivers might be temporarily disabled due to fading, the others might at that time be sufficiently operative to maintain communication.

Fig. 8 gives a typical example of the application of the noise separator in a non-electrical problem. The fact that the microphones and amplifiers used are electrical or electronic is purely incidental and is not a condition upon which the value of the principle depends.

Five microphones 103, 103', 103'', 103''', and 103'''' are shown. Each supplies a signal into its own pre-amplifier 104, 104' . . . 104''''. The outputs of these amplifiers are connected in parallel. They are then further amplified in a post-amplifier 105 from which the final output can be taken at terminals 106 and 107. Around and near each microphone are shown a number of persons. Those in the vicinity of microphone 103 are identified as 103–A, 103–B, 103–C, etc., those in the vicinity of microphone 103' as 103'–A, 103'–B, and so on.

If we now assume that these people produce independent random sounds, for instance by carrying on independent conversations, rustling papers, shuffling feet, sneezing, heckling, etc., and if we further assume that the people in each group are so near to their "own" microphone and so far away from the other microphones that their random sounds are not picked up by neighboring microphones, then we would have a perfect example of a noise-separator-set-up which will reduce relative noise power truly proportional to the number of "strands," in this case by a ratio of 1/5. To continue our practical example: If the five microphones are mounted to pick up the sound of a new jet engine or an atomic explosion at a considerable distance, that is if the nature of the event would require a considerable spacing between it and the spectators and microphones, then the background babbling of voices can be reduced in accordance with noise separator Equations 6 and 7 by using multiple microphones.

Again we have to modify our statement. In reality it will be almost impossible to place the microphones, or to arrange the audience, in such manner that each microphone has its "own" group of people associated with it. Instead neighboring microphones will almost unavoidably pick up partially, and sometimes even equally, the background sounds of individuals belonging to another group. This then would give us a certain "correlation factor" between background noise signals, and our Equations 6 and 7 would have to be modified by the average correlation factor. In other words, the improvement would not be as strict as predicted by Equations 6 and 7; but it would still be substantial, and thus it would be worthwhile using a large number of microphones, each being equipped or not with its own pre-amplifier.

The noise separator principle can be applied to any "physical" transducers, including optical transducers, thermal transducers, chemical transducers, etc.

Figure 9:
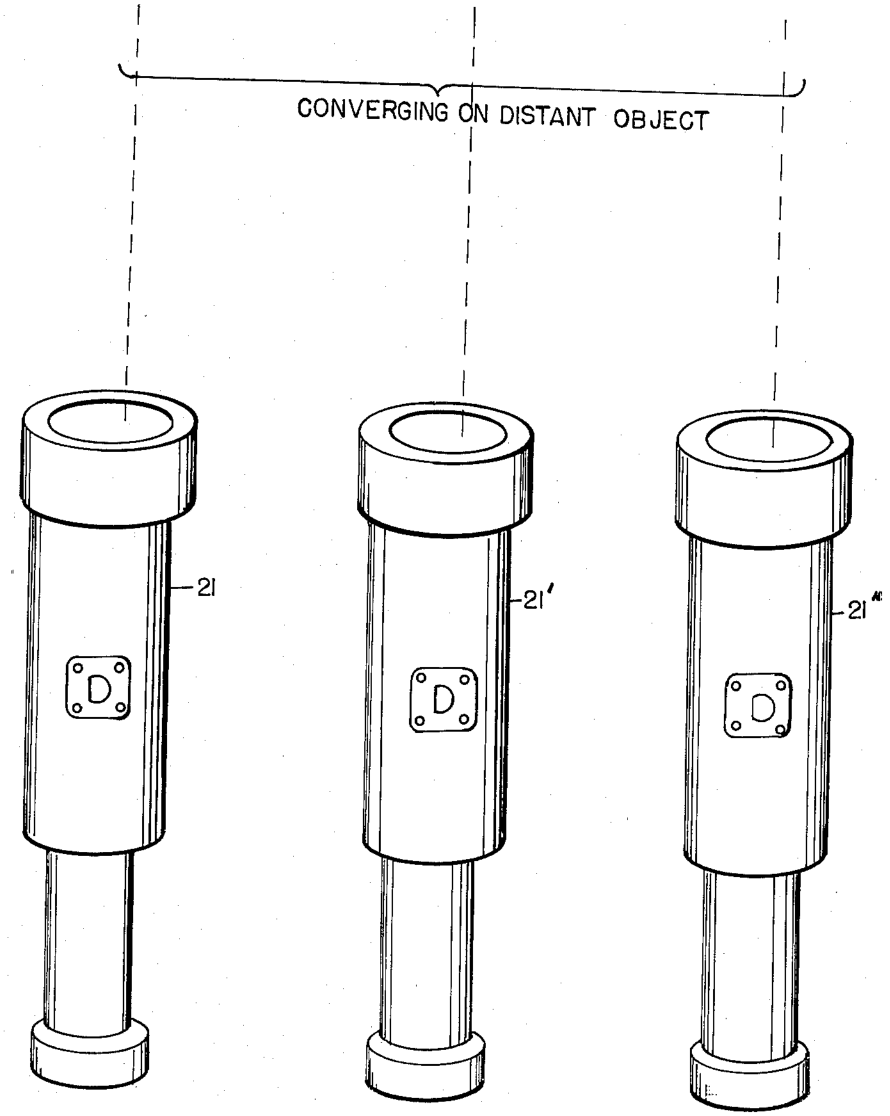

Fig. 9 shows a telescope 21 which forms part of a sky-scanning mechanism (not shown here) to spot weak light sources such as weak star light or the infra-red heat rays emitted by an airplane engine. The optical signals thus received are transferred to a television screen or to some other automatic indicating or warning device. By providing more than one such scanning device (two additional scanners 21' and 21'' are shown) and by combining their optical output signals either optically or by some other means, for instance electronically, in subsequent stages, "optical noise," in this case random fluctuations of the optical signal, can be reduced in the same manner in which acoustical and electrical noise were reduced in the previous examples given.

In order to minimize correlation of optical noise in the three transducers as much as possible, it may be found advisable to locate them physically at suitable distances from each other. An improved signal-to-noise ratio can thus be achieved and the sensitivity of the optical scanning system increased.

A good thermal example would be another sky-scanning system which uses strictly heat-sensitive elements such as thermo-couples as its detecting device. In other words, the telescopes in Fig. 9 may be thermo-telescopes instead of optical telescopes. In either case any conventional ray-gathering system such as lenses, mirrors, or electro-optical means of bundling may be used. Obviously the principle of optical or thermal noise reduction is not restricted to scanning systems but may also be applied to the projection of both virtual and real pictures, both optical and thermal.

Beyond purely physical problems, the noise separator principle can also be applied to abstract forms of intelligence reception and evaluation. For example, if an intelligence agency has received a large number of conflicting reports describing the same event, we can say that each event has been transduced through the process of abstract thought. The evaluation of these reports is again an abstract transducing activity. A completely accurate factual report can be compared to our electronic signal, being free from noise, while individual deviations from the truth can be likened to noise. If the deviations from truth are accidental, they can be compared to random noise, such as thermal noise in amplifiers, while deliberate falsifications can be compared to radio jamming signals.

The noise separator principle can thus be used to come closer to the truth (corresponding to improvement of signal-to-noise ratio) than is possible by arbitrarily accepting one report and discarding others. A practical transformation of the noise separator principle into abstract intelligence work could be brought about by transcribing all received reports onto I.B.M. punch cards. There are then fed into an evaluator or electronic computer comprising the noise separator, that is a mixing device following the examples of electronic amplifier noise separators described above.

Although the use of the noise separator principle for the separation of truth from untruth seems rather remote in a patent application describing noise reduction in transducers and amplifiers, it will nevertheless serve to show that the basic principle underlying the noise separator is so fundamental that it can be applied to any conceivable activity involving intelligence or signal transmission and reception, and their evaluation.

The examples of amplifiers, acoustical systems, and intelligence receiving systems in general given in the foregoing specifications are not intended to limit the invention to the actual examples cited, nor to the circuit details given. For instance, while some amplifiers show direct inter-connection in their input or output circuits, others have decoupling resistors. In reality these can be arranged in plate, grid or cathode circuits, or any combination thereof. No limitation to R-C-coupled amplifiers is intended here. The noise separator principle may be applied to L-C tuned amplifiers, distributed amplifiers, chain amplifiers, cathode-fed grounded-grid amplifiers, and any other imaginable form of electronic, electrical, magnetic, mechanical, hydraulic, thermo-dynamic, or chemical amplifier.

What I claim as new and wish to protect in this patent application is:

In a signal amplifying system having a plurality of cascaded amplifying stages, each of said stages comprising a plurality of substantially identical low-noise, low-level amplifiers connected in parallel for continuous simultaneous operation, each of said amplifying stages having a greater number of said amplifiers than the next succeeding stage with the output of each stage being coupled to the input of the next succeeding stage, an input circuit for continuously coupling substantially identical signals to the amplifiers in the first of said amplifying stages, and a single signal output being taken from the last of said amplifying stages.

References Cited in the file of this patent

UNITED STATES PATENTS

| | | |
|---|---|---|
| 1,550,684 | Espenschied | Aug. 25, 1923 |
| 1,830,210 | Oswald et al. | Nov. 3, 1931 |
| 2,067,432 | Beverage | Jan. 12, 1937 |
| 2,253,867 | Peterson | Aug. 26, 1941 |
| 2,546,837 | Stribling | Mar. 27, 1951 |
| 2,697,746 | Kennedy | Dec. 21, 1954 |
| 2,719,191 | Hermes | Sept. 27, 1955 |
| 2,727,141 | Cheek | Dec. 13, 1955 |
| 2,757,244 | Tomcik | July 31, 1956 |
| 2,757,571 | Loughren | Aug. 7, 1956 |
| 2,801,295 | Sabaroff | July 30, 1957 |
| 2,854,530 | Van Eldik | Sept. 30, 1958 |

FOREIGN PATENTS

| | | |
|---|---|---|
| 237,096 | Switzerland | Aug. 1, 1945 |